United States Patent
Liang

(10) Patent No.: US 10,255,902 B2
(45) Date of Patent: Apr. 9, 2019

(54) VOICE SYNTHESIS DEVICE, VOICE SYNTHESIS METHOD, BONE CONDUCTION HELMET AND HEARING AID

(71) Applicant: BOE TECHNOLOGY GROUP CO., LTD., Beijing (CN)

(72) Inventor: Xuan Liang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/181,069

(22) PCT Filed: Nov. 12, 2015

(86) PCT No.: PCT/CN2015/094438
§ 371 (c)(1),
(2) Date: Jun. 13, 2016

(87) PCT Pub. No.: WO2016/206285
PCT Pub. Date: Dec. 29, 2016

(65) Prior Publication Data
US 2018/0190261 A1    Jul. 5, 2018

(30) Foreign Application Priority Data
Jun. 25, 2015 (CN) .......................... 2015 1 0358985

(51) Int. Cl.
*G10L 21/00* (2013.01)
*G10L 21/02* (2013.01)
(Continued)

(52) U.S. Cl.
CPC ................ *G10L 13/02* (2013.01); *A42B 3/30* (2013.01); *G10L 25/84* (2013.01); *H04R 1/028* (2013.01); *H04R 17/02* (2013.01); *H04R 25/00* (2013.01)

(58) Field of Classification Search
CPC .............. H04R 17/005; H04R 2225/43; H04R 2460/13; H04R 17/02; G10L 13/00
See application file for complete search history.

(56) References Cited

U.S. PATENT DOCUMENTS 5,390,254 A * 2/1995 Adelman ............. H04R 19/016
381/313
2006/0277664 A1 12/2006 Akhtar et al.
(Continued)

FOREIGN PATENT DOCUMENTS

CN    101459868 A    6/2009
CN    102149038 A    8/2011
(Continued)

OTHER PUBLICATIONS

China Second Office Action for Application No. 201510358985.X, dated Dec. 6, 2016, 11 pps.
(Continued)

*Primary Examiner* — Olujimi A Adesanya
(74) *Attorney, Agent, or Firm* — Armstrong Teasdale LLP

(57) ABSTRACT

The present disclosure provides a voice synthesis device, a voice synthesis method, a bone conduction helmet and a hearing aid. The voice synthesis device of the present disclosure comprises an aggregation node and a plurality of detection nodes, wherein the detection nodes are used for detecting external voice signals and transmitting the external voice signals to the aggregation node. The aggregation node is used for filtering the detected voice signals and synthesizing the voice signals sent by trusted detection nodes. Thus, the bit error rate of voice signals can be reduced significantly, and the accuracy of voice signals can be improved.

16 Claims, 4 Drawing Sheets

(51) Int. Cl.
   *G10L 13/00* (2006.01)
   *G10L 13/02* (2013.01)
   *A42B 3/30* (2006.01)
   *H04R 25/00* (2006.01)
   *G10L 25/84* (2013.01)
   *H04R 1/02* (2006.01)
   *H04R 17/02* (2006.01)

(56) References Cited

U.S. PATENT DOCUMENTS

| | | | |
|---|---|---|---|
| 2011/0255722 A1* | 10/2011 | Pedersen | H04R 25/554 381/315 |
| 2011/0288858 A1* | 11/2011 | Gay | G10L 21/028 704/226 |
| 2013/0070935 A1* | 3/2013 | Hui | G10K 11/16 381/71.1 |
| 2013/0343585 A1* | 12/2013 | Bennett | H04R 25/554 381/315 |
| 2014/0324421 A1* | 10/2014 | Kim | G10L 15/20 704/233 |
| 2015/0110321 A1* | 4/2015 | Siegumfeldt | H04R 25/407 381/323 |
| 2015/0199977 A1* | 7/2015 | Ungstrup | H04R 25/55 704/260 |

FOREIGN PATENT DOCUMENTS

| | | |
|---|---|---|
| CN | 102341069 A | 2/2012 |
| CN | 102930864 A | 2/2013 |
| CN | 103533123 A | 1/2014 |
| CN | 104116262 A | 10/2014 |
| CN | 104735599 A | 6/2015 |
| EP | 2309777 A1 | 4/2011 |
| EP | 2387252 A1 | 11/2011 |
| JP | 2002227025 A | 8/2002 |
| KR | 20110004763 U | 5/2011 |
| WO | 2014132167 A1 | 9/2014 |

OTHER PUBLICATIONS

First Office Action for CN Application No. 201510358985.X, dated Sep. 7, 2016 (5 pages).
International Search Report for PCT/CN2015/094438, dated Mar. 22, 2016 (5 pages).
Written Opinion of the International Searching Authority for PCT/CN2015/094438, dated Mar. 22, 2016 (5 pages).
European Extended Search Report, Application No. 15864302.3, dated Jan. 29, 2019, 8 pps.

* cited by examiner

VOICE SYNTHESIS DEVICE, VOICE SYNTHESIS METHOD, BONE CONDUCTION HELMET AND HEARING AID

CROSS REFERENCE TO RELATED APPLICATIONS

This application is a National Stage Entry of PCT/CN2015/094438 filed Nov. 12, 2015, which claims the benefit and priority of Chinese Patent Application No. 201510358985.X filed Jun. 25, 2015. The entire disclosure of each of the above applications is incorporated herein by reference.

BACKGROUND

The present disclosure relates to the technical field of communication equipment, and more particularly, to a voice synthesis device, a voice synthesis method, a bone conduction helmet and a hearing aid.

At present, a bone conduction helmet has been used in the medical field. The application of the bone conduction helmet changes people's traditional cognition on voice, and its major advantage is that sound can be "heard" by the skull instead of the ears.

A work principle of a bone conduction hearing aid is to use the bone conduction helmet to convert sound to an electrical signal, then to convert the amplified electrical signal to mechanical energy and transmit the mechanical energy to the skull, so as to vibrate the internal structure of the cochlea to transmit the sound.

Existing bone conduction hearing aids are mainly divided into analog hearing aids and digital hearing aids. The analog hearing aid uniformly amplifies sound regardless of the shape of a patient's hearing loss curve. The digital hearing aid performs corresponding compensation and amplification on sound according to the shape of the patient's hearing loss curve.

The existing digital hearing aid generally uses a voice signal detection sensor device in a bone conduction helmet, and detected voice signals are directly transmitted to the skull of a listener without verification. Such voice signals are high in bit error rate and low in accuracy.

BRIEF DESCRIPTION

Embodiments of the present disclosure provide a voice synthesis device, a voice synthesis method, a bone conduction helmet and a hearing aid.

According to an aspect of the present disclosure, there is provided a voice synthesis device, including a plurality of detection nodes configured to detect voice signals, and an aggregation node configured to receive the voice signals sent by the plurality of detection nodes, to determine whether each of the plurality of detection nodes is trusted, and to synthesize the voice signals sent by the detection nodes which are determined to be trusted to obtain a synthesized voice signal.

In embodiments of the present disclosure, the detection node is further configured to send a feedback signal to the aggregation node in response to receiving a broadcast signal sent by the aggregation node, the aggregation node is further configured to send the broadcast signal to the plurality of detection nodes, to determine a trust degree for each of the detection nodes in response to receiving the feedback signal from each of the plurality of detection nodes, and to determine whether the detection node is trusted based on its trust degree.

In embodiments of the present disclosure, the voice synthesis device further comprises a central processing node configured to receive the synthesized voice signals transmitted by a plurality of aggregation nodes, and to synthesize the received synthesized voice signals.

In embodiments of the present disclosure, the aggregation node includes a first wireless transceiver configured to receive the voice signals sent by the plurality of detection nodes, and a first program controller configured to determine whether each of the plurality of detection nodes is trusted, and to synthesize the voice signals sent by the detection nodes which are determined to be trusted to obtain the synthesized voice signal.

In embodiments of the present disclosure, the first wireless transceiver is further configured to send the broadcast signal to the plurality of detection nodes, and receive the feedback signal from each of the plurality of detection nodes, and the first program controller is further configured to determine the trust degree for each of the plurality of detection nodes, and to determine whether the detection node is trusted based on its trust degree.

In embodiments of the present disclosure, the first program controller further comprises a voltage-stabilizing circuit.

In embodiments of the present disclosure, the first wireless transceiver is based on ZigBee wireless protocol.

In embodiments of the present disclosure, the aggregation node further includes a first voice sensing module configured to transmit the synthesized voice signal to the central processing node.

In embodiments of the present disclosure, the first voice sensing module is a piezoelectric vibration sensor.

In embodiments of the present disclosure, the detection node includes a second voice sensing module configured to detect the voice signal, and a second wireless transceiver configured to send the voice signal detected by the second voice sensing module to the aggregation node.

In embodiments of the present disclosure, the second wireless transceiver is further configured to receive the broadcast signal sent by the aggregation node, and send the feedback signal to the aggregation node.

In embodiments of the present disclosure, the second wireless transceiver is based on ZigBee wireless protocol.

In embodiments of the present disclosure, the second voice sensing module is a piezoelectric vibration sensor.

According to another aspect of the present disclosure, there is provided a voice synthesis method, including receiving voice signals sent by a plurality of detection nodes, determining whether each of the plurality of detection nodes is trusted, and synthesizing the voice signals sent by the detection nodes which are determined to be trusted to obtain a synthesized voice signal.

In embodiments of the present disclosure, determining whether each of the plurality of detection nodes is trusted includes sending a broadcast signal to the plurality of detection nodes, determining a trust degree for each of the detection nodes in response to receiving a feedback signal from each of the plurality of detection nodes, and determining whether the detection node is trusted based on its trust degree.

In embodiments of the present disclosure, the voice synthesis method further includes transmitting the synthesized voice signal to the central processing node.

In embodiments of the present disclosure, the trust degree for the detection node is determined as:

$$K_i(t) = \frac{\left|Y_i(t) - 1/n \sum_{i=1}^{n} Y_i(t)\right|}{1/n \sum_{i=1}^{n} Y_i(t)}$$

wherein $K_i(t)$ denotes the trust degree for a detection node i at time t, n denotes the number of the plurality of detection nodes, and $Y_i(t)$ denotes a voice signal detected by the detection node i at time t, as the feedback signal.

In embodiments of the present disclosure, determining whether the detection node is trusted based on its trust degree includes comparing the trust degree with a predefined threshold, and in response to the trust degree $K_i(t)$ being greater than or equal to the predefined threshold, determining that the detection node i is not trusted at time t, and in response to the trust degree $K_i(t)$ being smaller than the predefined threshold, determining that the detection node i is trusted at time t.

In embodiments of the present disclosure, the predefined threshold is 0.3.

In embodiments of the present disclosure, synthesizing the voice signals sent by detection nodes which are determined to be trusted includes calculating a weight of the voice signal from each of the trusted detection nodes as:

$$\omega_i(t) = \frac{1 - K_i(t)}{\sum_{i=1}^{n, i \neq k} (1 - K_i(t))}$$

wherein $\omega_i(t)$ denotes the weight of the voice signal from the trusted detection node i, $K_i(t)$ denotes the trust degree for the trusted detection node i at time t, and k denotes an untrusted detection node at time t, and synthesizing the voice signals from the trusted detection nodes to obtain the synthesized voice signal as follows:

$$Y_{all}(t) = \sum_{i=1}^{n, i \neq k} \omega_i(t) Y_i(t)$$

where $Y_{all}(t)$ denotes the synthesized voice signal.

In embodiments of the present disclosure, in response to the times that the detection node is determined to be untrusted reaching a predetermined value, the voice synthesis method further includes sending a node error signal indicative of the abnormality of the detection node.

According to still another aspect of the present disclosure, there is provided a bone conduction helmet, including a helmet body and the foregoing voice synthesis device disposed on the helmet body.

In embodiments of the present disclosure, a plurality of detection nodes in the voice synthesis device are dispersedly disposed on the helmet body.

According to still another aspect of the present disclosure, there is provided a hearing aid, including the foregoing voice synthesis device.

In the voice synthesis device of embodiments of the present disclosure, the plurality of detection nodes detect external voice signals and transmit the external voice signals to an aggregation node, and the aggregation node filters the detected voice signals and synthesizes the voice signals sent by detection nodes determined to be trusted. Thus, voice signals of untrusted detection nodes may be abandoned so that the voice signals actually used are trusted. In this way, the bit error rate of the voice signals can be reduced significantly, the accuracy of the voice signals can be improved, and the flexibility of the bone conduction helmet can be improved. The voice synthesis method of the embodiments of the present disclosure is strong in adaptability and high in reliability.

BRIEF DESCRIPTION OF THE DRAWINGS

To describe embodiments of the present disclosure more clearly, the following will briefly introduce the accompanying drawings of certain embodiments. It should be known that the accompanying drawings in the following description merely relate to some embodiments of the present disclosure, but do not limit the present disclosure, wherein.

DETAILED DESCRIPTION

To make the present disclosure clearer, the following will clearly and completely describe embodiments of the present disclosure with reference to the accompanying drawings. It should be understood that the described embodiments are some but not all of the embodiments of the present disclosure. All other embodiments obtained by a person skilled in the art based on the described embodiments of the present disclosure without creative efforts shall fall in the protection scope of the present disclosure.

Figure 1:
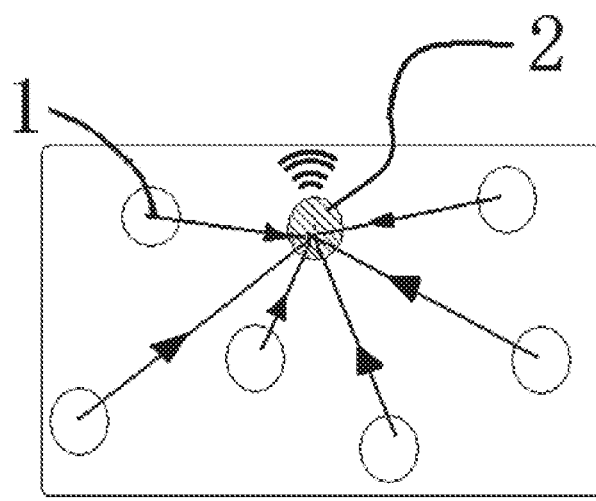
FIG. 1 is a schematic structural diagram of a voice synthesis device according to an embodiment of the present disclosure.

FIG. 1 shows a schematic diagram of a voice synthesis device according to an embodiment of the present disclosure. As shown in FIG. 1, the voice synthesis device comprises an aggregation node 2 and a plurality of detection nodes 1. Each of the plurality of detection nodes 1 may detect an external voice signal and send the detected voice signal to the aggregation node 2. The aggregation node 2 may receive the voice signals sent by the plurality of detection nodes 1 and determine whether each of the plurality of detection nodes 1 is trusted. Then, the aggregation node 2 may synthesize voice signals sent by detection nodes determined to be trusted to obtain a synthesized voice signal. In the following, detection nodes 1 determined to be trusted are referred to as trusted detection nodes.

In embodiments of the present disclosure, the detection nodes 1 may detect the external voice signals in real time and send the external voice signals to the aggregation node 2. Further, the detection nodes 1 may also receive a broadcast signal sent by the aggregation node 2, and send feedback signals to the aggregation node 2 after receiving the broadcast signal. The aggregation node 2 may periodically send the broadcast signal to each of the detection nodes 1, and receive the feedback signal from each of the detection nodes 1. After receiving the feedback signal from each of the plurality of detection nodes 1, the aggregation node 2 may determine a trust degree for each detection node 1, and determine whether the detection node 1 is trusted based on its determined trust degree. Then, the aggregation node 2 synthesizes the external voice signals detected by the trusted detection nodes according to a determination result. According to the voice synthesis device of this embodiment, the aggregation node 2 may filter the received voice signals and synthesize the voice signals sent by the trusted detection nodes. Thus, the bit error rate of voice signals may be reduced significantly, and the accuracy of voice signals may be improved.

In embodiments of the present disclosure, the aggregation node 2 may include a first wireless transceiver, a first program controller and a first voice sensing module. The first wireless transceiver may receive the voice signals sent by the plurality of detection nodes 1. In addition, the first wireless transceiver may periodically send the broadcast signal to each of the detection nodes 1, and receive the feedback signal from each of the detection nodes 1. For example, the first wireless transceiver may be based on ZigBee wireless protocol. Those skilled in the art may also use any transceiver based on other wireless protocols. The first program controller may include a broadcast unit, a first reception unit, a detection unit and a synthesis unit. The broadcast unit may drive the aggregation node 2 to periodically send the broadcast signal to each of the detection nodes 1. The first reception unit may drive the aggregation node 2 to receive the feedback signal from each of the detection nodes 1. The detection unit may determine the trust degree for each of the detection nodes 1 according to the feedback signal, and determine whether the detection node 1 is trusted based on its trust degree. The synthesis unit may synthesize the external voice signals detected by trusted detection nodes according to determination results of the detection unit. Further, the first program controller also includes a voltage-stabilizing circuit. The first voice sensing module may transmit the synthesized voice signal to an external device. For example, the first voice sensing module may be a piezoelectric vibration sensor. Those skilled in the art may also use any other type of module that can transmit voice signals to an external device.

In embodiments of the present disclosure, the detection node 1 may include a second voice sensing module, a second wireless transceiver and a second program controller. The second voice sensing module may detect the external voice signals. For example, the second voice sensing module may be a piezoelectric vibration sensor. Those skilled in the art may also use any module that can detect external voice signals. The second wireless transceiver may send the external voice signals detected by the second voice sensing module to the aggregation node 2. In addition, the second wireless transceiver may receive the broadcast signal sent by the aggregation node 2, and send the feedback signal to the aggregation node 2. For example, the second wireless transceiver may be based on ZigBee wireless protocol. Those skilled in the art may also use any transceiver based on other wireless protocols. The second program controller may include a second reception unit and a transmission unit. The second reception unit may drive the detection node 1 to detect the external voice signals in real time, and drive the detection node 1 to receive the broadcast signal sent by the aggregation node 2. The transmission unit may drive the detection node 1 to transmit detected external voice signals to the aggregation node 2, and drive the detection node 1 to send the feedback signal to the aggregation node 2 after receiving the broadcast signal sent by the aggregation node 2. Further, the second program controller may also include a voltage-stabilizing circuit.

Figure 2:
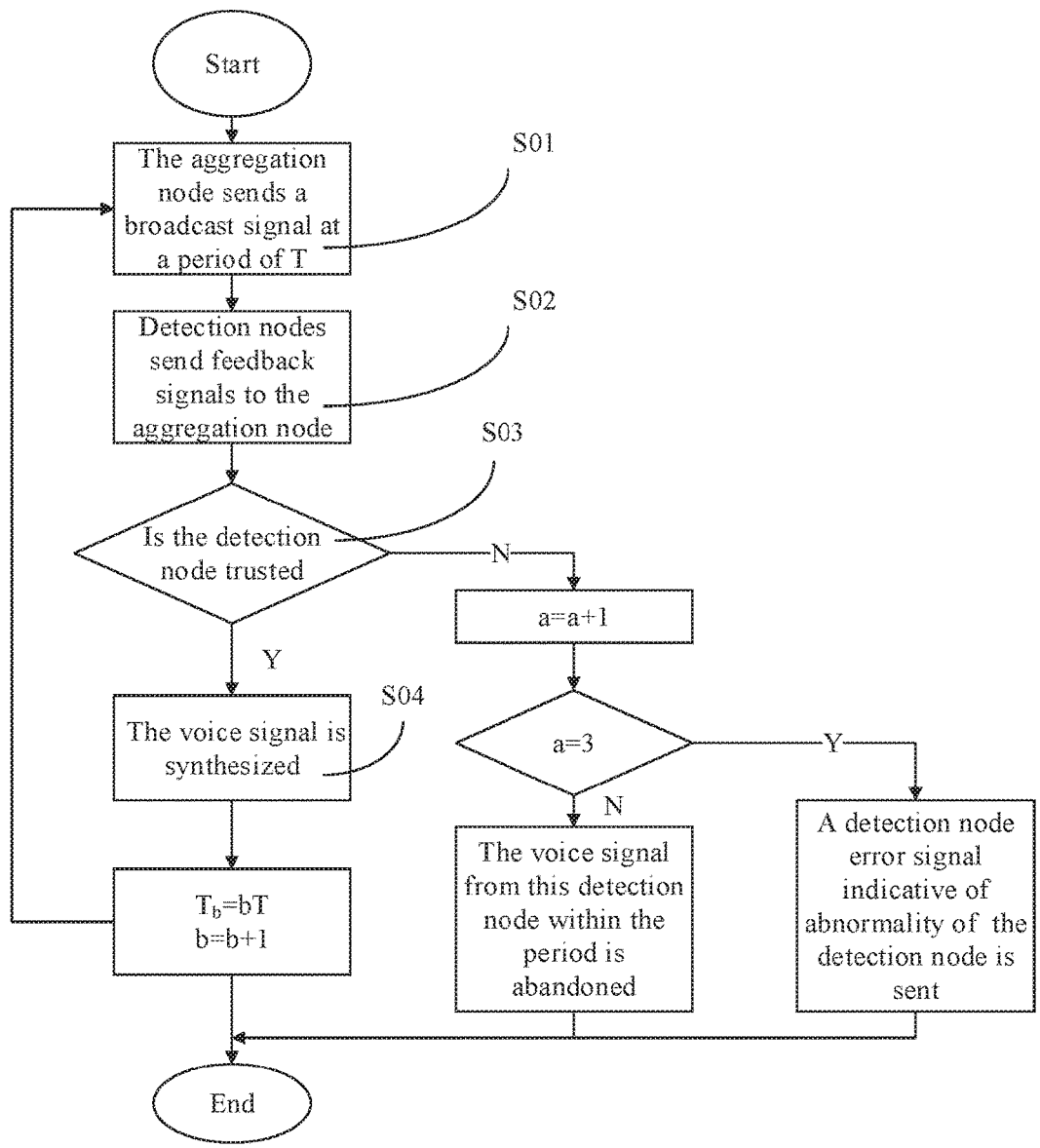
FIG. 2 is a flowchart of a voice synthesis method according to an embodiment of the present disclosure.

FIG. 2 shows a voice synthesis method according to an embodiment of the present disclosure, which may be used in the voice synthesis device as shown in FIG. 1.

As shown in FIG. 2, firstly, in Step S01, the detection nodes 1 detect the external voice signals and transmit the external voice signals to the aggregation node 2. The aggregation node 2 receives the voice signals sent by a plurality of detection nodes 1. In addition, the aggregation node 2 periodically sends a broadcast signal to each of the detection nodes 1. In FIG. 2, a predetermined time T signifies a period in which the aggregation node 2 sends a broadcast signal to each of the detection nodes 1. Each period may be expressed by a form of $T_b=bT$, where b signifies a periodic coefficient and is a natural number such as 1, 2, 3 and so on. $T_1=1T$ represents a first period, and $T_2=2T$ represents a second period and so on.

Then in Step S02, the detection nodes 1 receive the broadcast signal sent by the aggregation node 2. The detection nodes 1 send feedback signals to the aggregation node 2 after receiving the broadcast signal.

Then, in Step S03, the aggregation node 2 determines whether each of the plurality of detection nodes 1 is trusted. That is, after receiving the feedback signal from each of the detection nodes 1, the aggregation node 2 determines the trust degree for each detection node 1, and determines whether the detection node 1 is trusted based on the trust degree. In the following, description is made by taking an example in which the feedback signals adopt the external voice signals. However, those skilled in the art should know that the feedback signals may also adopt any other signals available for determining the trust degree for each detection node 1.

In a case where external voice signals are used, the trust degree for a detection node i may be determined according to the following formula:

$$K_i(t) = \frac{\left| Y_i(t) - 1/n \sum_{i=1}^{n} Y_i(t) \right|}{1/n \sum_{i=1}^{n} Y_i(t)},$$

where $K_i(t)$ signifies the trust degree for a detection node i at time t, n signifies the number of the detection nodes 1, i signifies any one of n detection nodes 1, and $Y_i(t)$ signifies an external voice signal gathered by the detection node i at time t. In other words, the trust degree for the detection node is a ratio of an absolute value of difference between an external voice signal gathered by the detection node i and a mean value of external voice signals gathered by n detection nodes 1 to the foregoing mean values.

After the trust degree is determined, the aggregation node 2 determines whether the detection node 1 is trusted based on the trust degree. If the trust degree $K_i(t) \geq$ a predefined threshold, the detection node i is not trusted at time t, and the external voice signal detected by the detection node i at time t is abandoned. If the trust degree $K_i(t) <$ the predefined threshold, the detection node i is trusted at time t, and the external voice signal detected by the detection node i at time t are available for aggregation node 2 to synthesize voice signals at time t. For example, the predefined threshold may be 0.3, that is, if the trust degree for a detection node 1 is smaller than 0.3, it may be regarded that this detection node 1 is trusted, and thus voice signals detected by this detection node 1 may be available for the aggregation node 2 to synthesize voice signals at this moment. In FIG. 2, it is determined whether a detection node i is trusted in each period. In a period of $T_b$, if this detection node is trusted, external voice signals detected by this detection node within the period of $T_b$ are synthesized. If this detection node is not trusted, external voice signals detected by this detection node within the period of $T_b$ are abandoned.

Further, in embodiments of the present disclosure, in a case where a detection node k is continuously determined to be not trusted (i.e., untrusted) and the number of times thereof reach a predetermined value, this indicates that an exception has occurred in the detection node k, and an exception analysis and treatment need to be made for the detection node k. In such a case, the aggregation node 2 sends a node error signal indicative of abnormality of the detection node k. For example, the predetermined value of the times may be 3 (in FIG. 2, a=3).

Finally, in Step S04, the aggregation node 2 synthesizes external voice signals sent by trusted detection nodes to obtain synthesized voice signals. In this step, first of all, the aggregation node 2 calculates a weight of a voice signal of each of the trusted detection nodes as:

$$\omega_i(t) = \frac{1 - K_i(t)}{\sum_{i=1}^{n, i \neq k} (1 - K_i(t))},$$

where $\omega_i(t)$ denotes the weight of the voice signal of the trusted detection node i, $K_i(t)$ denotes the trust degree for the trusted detection node i at time t, and k denotes a detection node determined to be untrusted at time t. Then, the aggregation node synthesizes voice signals from all of the trusted detection nodes to obtain the synthesized voice signal as:

$$Y_{all}(t) = \Sigma_{i=1}^{n, i \neq k} \omega_i(t) Y_i(t),$$

where $Y_{all}(t)$ denotes the synthesized voice signal.

In the embodiments of the present disclosure, if n detection nodes all are trusted detection nodes at time t, the weight of the voice signal of the detection node i is calculated according to the following formula:

$$\omega_i(t) = \frac{1 - K_i(t)}{\sum_{i=1}^{n} (1 - K_i(t))},$$

Further, voice signals are synthesized according to the following formula:

$$Y_{all}(t) = \Sigma_{i=1}^{n} \omega_i(t) Y_i(t).$$

The voice synthesis method of the embodiments of the present disclosure is strong in adaptability and high in reliability.

Figure 3:
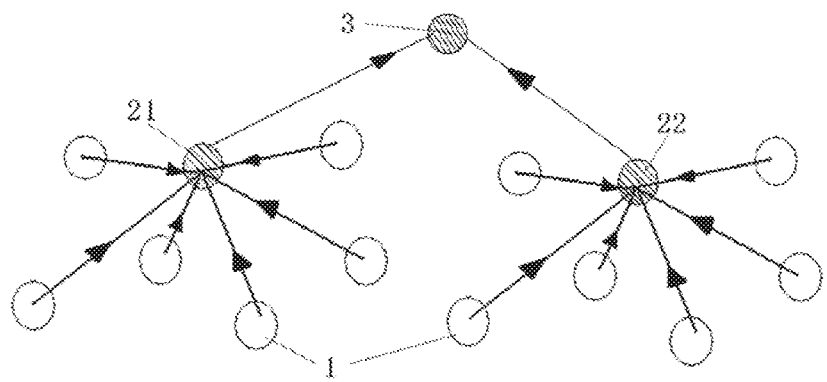
FIG. 3 is a schematic structural diagram of the voice synthesis device according to another embodiment of the present disclosure.

FIG. 3 shows a schematic structural diagram of the voice synthesis device according to another embodiment of the present disclosure. In this embodiment, in addition to the detection node 1 and the aggregation node 2, the voice synthesis device further comprises a central processing node 3 configured to receive synthesized voice signals transmitted by a plurality of aggregation nodes 2 and synthesize the synthesized voice signals received.

As shown in FIG. 3, the voice synthesis device includes one central processing node 3, two aggregation nodes 2 (a first aggregation node 21 and a second aggregation node 22 respectively) and a plurality of detection nodes 1. The first aggregation node 21 and the second aggregation node 22 separately manage a plurality of detection nodes 1. Detection nodes 1 managed by the first aggregation node 21 transmit the detected external voice signals to the first aggregation node 21. Detection nodes 1 managed by the second aggregation node 22 transmit the external voice signals to the second aggregation node 22. The first aggregation node 21 synthesizes the voice signals transmitted by a plurality of detection nodes 1 managed by the first aggregation node 21, and transmits the synthesized voice signal to the central processing node 3. The second aggregation node 22 synthesizes the voice signals transmitted by a plurality of detection nodes 1 managed by the second aggregation node 22, and transmits the synthesized voice signal to the central processing node 3. The central processing node 3 synthesizes the synthesized voice signals transmitted by the first aggregation node 21 and the second aggregation node 22.

Figure 4:
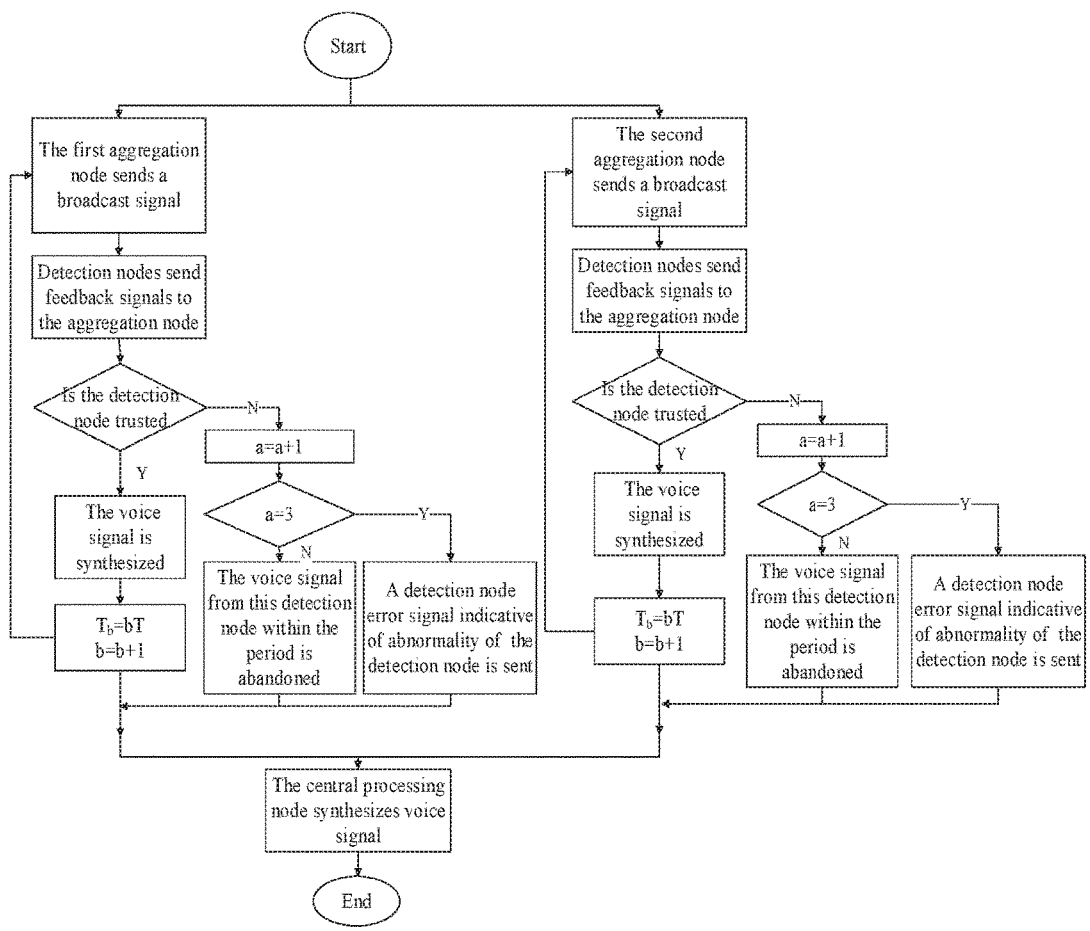
FIG. 4 is a flowchart of the voice synthesis method according to another embodiment of the present disclosure.

FIG. 4 shows a flowchart of the voice synthesis method according to another embodiment of the present disclosure, which may be used in the voice synthesis device as shown in FIG. 3. In this embodiment, a process in synthesizing voice signals from detection nodes 1 managed by the first aggregation node 21 and the second aggregation node 22 is the same as the voice synthesis method of the embodiment as shown in FIG. 2, and thus a description thereof is omitted herein. After the first aggregation node 21 and the second aggregation node 22 synthesize voice signals of detection nodes 1 respectively managed by them, they separately transmit the synthesized voice signals to the central processing node 3. The central processing node 3 further synthesizes the synthesized voice signals transmitted by the first aggregation node 21 and the second aggregation node 22 to serve as a final synthesized voice signal.

As previously mentioned, the first aggregation node 21 may synthesize voice signals according to the following formula:

$$Y_{21\ all}(t) = \Sigma_{i=1}^{n, i \neq k} \omega_i(t) Y_i(t),$$

The second aggregation node 22 may synthesize voice signals according to the following formula:

$$Y_{22\ all}(t) = \Sigma_{j=1}^{m, j \neq p} \omega_j(t) Y_j(t),$$

Thus, the central processing node 3 may synthesize final voice signals according to the following formula:

$$Y_{all}(t) = \frac{1}{2}(Y_{21\ all}(t) + Y_{22\ all}(t))$$

where $Y_{21\ all}(t)$ denotes the synthesized voice signal transmitted by the first aggregation node 21, $Y_{22\ all}(t)$ denotes the synthesized voice signal transmitted by the second aggregation node 22, and $Y_{all}(t)$ denotes the final voice signal synthesized by the central processing node 3. In addition, i denotes any detection node 1 among n detection nodes 1 managed by the first aggregation node 21, and j denotes any detection node 1 among m detection nodes 1 managed by the second aggregation node 22. Furthermore, k denotes a detection node determined to be untrusted at time t and managed by the first aggregation node 21, and p denotes a detection node determined to be untrusted at time t and managed by the second aggregation node 21.

It should be understood that specific implementation manners of the foregoing embodiments may be variously changed. Although in the foregoing embodiments, the embodiments of the present disclosure are described by taking one aggregation node or two aggregation nodes as an example, it is easily conceivable for a person skilled in the art that the voice synthesis device may also include more aggregation nodes, and each aggregation node may manage a plurality of detection nodes and synthesize voice signals from all of the managed detection nodes. In addition, in the foregoing embodiments a process of utilizing one central processing node to further comprehensively process voice signals synthesized by a plurality of aggregation nodes is described. However, it is easily conceivable for a person skilled in the art that a plurality of central processing nodes may also be used for processing.

Figure 5:
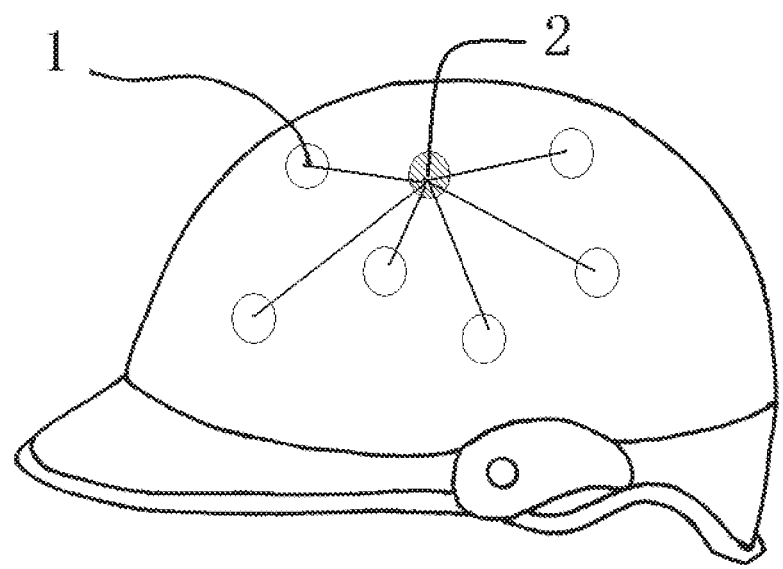
FIG. 5 is a schematic structural diagram of a bone conduction helmet according to an embodiment of the present disclosure.

FIG. 5 shows a schematic structural diagram of a bone conduction helmet according to an embodiment of the present disclosure. As shown in FIG. 5, the bone conduction helmet may include a helmet body and the voice synthesis device disposed on the helmet body. As shown in FIG. 5, the aggregation node may be disposed on the helmet body of the bone conduction helmet, and the detection nodes are dispersedly disposed on the helmet body of the bone conduction helmet. In a case where the voice synthesis device includes a plurality of aggregation nodes, the aggregation nodes may be dispersedly disposed on the helmet body. In a case where the voice synthesis device further includes a central processing node, the central processing node may also be disposed on the helmet body of the bone conduction helmet.

In addition, embodiments of the present disclosure further provide a hearing aid including the voice synthesis device described in the foregoing embodiments.

It is to be understood that the foregoing implementation manners are merely exemplary implementation manners to describe the principle of the present disclosure. However, the present disclosure is not limited to this. To those skilled in the art, various modifications and improvements may be made without departing from the spirit and essence of the present disclosure, and these modifications and improvements are also deemed to be within the scope of protection of the present disclosure.

What is claimed is:

1. A voice synthesis device comprising:
a plurality of detection nodes configured to detect voice signals, and
an aggregation node configured to receive the voice signals sent by the plurality of detection nodes, to determine whether each of the plurality of detection nodes is trusted, and to synthesize the voice signals sent by the detection nodes which are determined to be trusted to obtain a synthesized voice signal,
wherein the aggregation node comprises:
a first wireless transceiver configured to receive the voice signals sent by the plurality of detection nodes; and
a first program controller configured to determine whether each of the plurality of detection nodes is trusted, and to synthesize the voice signals sent by the detection nodes which are determined to be trusted to obtain the synthesized voice signal,
wherein each detection node of the plurality of detection nodes is further configured to send a feedback signal to the aggregation node in response to receiving a broadcast signal sent by the aggregation node, and
wherein the aggregation node is further configured to send the broadcast signal to the plurality of detection nodes, to determine a trust degree for each of the detection nodes in response to receiving the feedback signal from each of the plurality of detection nodes, and to determine whether each detection node is trusted based on its trust degree;
wherein the trust degree for each detection node is determined as:

$$K_i(t) = \frac{\left| Y_i(t) - 1/n \sum_{i=1}^{n} Y_i(t) \right|}{1/n \sum_{i=1}^{n} Y_i(t)},$$

wherein $K_i(t)$ denotes the trust degree for a detection node i at time t, n denotes the number of the plurality of detection nodes, and $Y_i(t)$ denotes a voice signal detected by the detection node i at time t, as the feedback signal.

2. The voice synthesis device according to claim 1, further comprising a central processing node configured to receive the synthesized voice signals transmitted by a plurality of aggregation nodes, and to synthesize the received synthesized voice signals.

3. The voice synthesis device according to claim 1,
wherein the first wireless transceiver is further configured to send the broadcast signal to the plurality of detection nodes, and to receive the feedback signal from each of the plurality of detection nodes, and
wherein the first program controller is further configured to determine the trust degree for each of the plurality of detection nodes, and to determine whether the detection node is trusted based on its trust degree,
wherein the first program controller further comprises a voltage-stabilizing circuit.

4. The voice synthesis device according to claim 1, wherein the first wireless transceiver is based on ZigBee wireless protocol.

5. The voice synthesis device according to claim 1, wherein the aggregation node further comprises:
a first voice sensing module configured to transmit the synthesized voice signal to a central processing node, wherein the first voice sensing module is a piezoelectric vibration sensor.

6. The voice synthesis device according to claim 5, wherein each detection node of the plurality of detection nodes comprises:
a second voice sensing module configured to detect the voice signal, and
a second wireless transceiver configured to send the voice signal detected by the second voice sensing module to the aggregation node.

7. The voice synthesis device according to claim 1, wherein the second wireless transceiver is further configured to receive the broadcast signal sent by the aggregation node, and to send the feedback signal to the aggregation node.

8. The voice synthesis device according to claim 1, wherein the second wireless transceiver is based on ZigBee wireless protocol, wherein the second voice sensing module is a piezoelectric vibration sensor.

9. A bone conduction helmet comprising:
a helmet body; and
the voice synthesis device according to claim 1 disposed on the helmet body.

10. The bone conduction helmet according to claim 9, wherein the plurality of detection nodes in the voice synthesis device are dispersedly disposed on the helmet body.

11. A hearing aid comprising the voice synthesis device according to claim 1.

12. A voice synthesis method, comprising:
receiving voice signals sent by a plurality of detection nodes,
determining whether each of the plurality of detection nodes is trusted, and
synthesizing the voice signals sent by the detection nodes which are determined to be trusted to obtain a synthesized voice signal;
wherein determining whether each of the plurality of detection nodes is trusted comprises:
sending a broadcast signal to the plurality of detection nodes;
determining a trust degree for each of the detection nodes in response to receiving a feedback signal from each of the plurality of detection nodes; and
determining whether each detection node is trusted based on its trust degree,
wherein the trust degree for each detection node is determined as:

$$K_i(t) = \frac{\left|Y_i(t) - 1/n\sum_{i=1}^{n} Y_i(t)\right|}{1/n\sum_{i=1}^{n} Y_i(t)},$$

wherein $K_i(t)$ denotes the trust degree for a detection node i at time t, n denotes the number of the plurality of detection nodes, and $Y_i(t)$ denotes a voice signal detected by the detection node i at time t, as the feedback signal.

13. The voice synthesis method according to claim 12 further comprising:
transmitting the synthesized voice signal to a central processing node.

14. The voice synthesis method according to claim 12, wherein determining whether the detection node is trusted based on its trust degree comprises:
comparing the trust degree with a predefined threshold, and
in response to the trust degree $K_i(t)$ being greater than or equal to the predefined threshold, determining that the detection node i is untrusted at time t, and in response to the trust degree $K_i(t)$ being smaller than the predefined threshold, determining that the detection node i is trusted at time t.

15. The voice synthesis method according to claim 12, wherein synthesizing the voice signals sent by detection nodes which are determined to be trusted comprises:
calculating a weight of the voice signal from each of the trusted detection nodes as:

$$\omega_i(t) = \frac{1 - K_i(t)}{\sum_{i=1}^{n, i \neq k} (1 - K_i(t))},$$

wherein $\omega_i(t)$ denotes the weight of the voice signal from the trusted detection node i, $K_i(t)$ denotes the trust degree for the trusted detection node i at time t, and k denotes an untrusted detection node at time t, and
synthesizing the voice signals from the trusted detection nodes to obtain the synthesized voice signal as follows:

$$Y_{all}(t) = \Sigma_{i=1}^{n, i \neq k} \omega_i(t) Y_i(t),$$

wherein $Y_{all}(t)$ denotes the synthesized voice signal,
wherein the predefined threshold is 0.3.

16. The voice synthesis method according claim 12 further comprising:
in response to a number of times that the detection node is determined to be untrusted reaching a predetermined value, sending a node error signal indicative of abnormality of the detection node.

* * * * *